United States Patent [19]

Pettersson et al.

[11] Patent Number: 5,090,359
[45] Date of Patent: Feb. 25, 1992

[54] MILKING MACHINE AND A METHOD OF MILKING BY MEANS OF THE SAME

[75] Inventors: Torbjörn Pettersson, Gnesta; Benny Örnerfors, Hägersten, both of Sweden

[73] Assignee: Alfa-Laval Agriculture International AB, Tumba, Sweden

[21] Appl. No.: 571,616

[22] PCT Filed: Feb. 17, 1989

[86] PCT No.: PCT/SE89/00069

§ 371 Date: Aug. 31, 1990

§ 102(e) Date: Aug. 31, 1990

[87] PCT Pub. No.: WO89/08384

PCT Pub. Date: Sep. 21, 1989

[30] Foreign Application Priority Data

Mar. 11, 1988 [SE] Sweden ............................ 8800893

[51] Int. Cl.$^5$ .............................................. A01J 5/00
[52] U.S. Cl. .................................. 119/14.08; 119/14.44
[58] Field of Search .............. 119/14.08, 14.14, 14.15, 119/14.44, 14.48, 14.02

[56] References Cited

U.S. PATENT DOCUMENTS

| 4,011,838 | 3/1977 | Nordegren et al. | 119/14.44 |
| 4,292,926 | 10/1981 | Tilman | 119/14.08 |
| 4,313,396 | 2/1982 | Olofsson | 119/14.44 |
| 4,574,736 | 3/1986 | Tanaka et al. | 119/14.08 |

FOREIGN PATENT DOCUMENTS

| 3609275 | 9/1987 | Fed. Rep. of Germany ... | 119/14.08 |
| 8404228 | 11/1984 | World Int. Prop. O. ....... | 119/14.08 |

Primary Examiner—John G. Weiss
Attorney, Agent, or Firm—Hovey, Williams, Timmons & Collins

[57] ABSTRACT

A milking apparatus comprises a teat cup (2) with a liner (3), means (6-8, 9-11, 13-15) for subjecting the interior of the liner to a pressure which is lower than atmospheric pressure, and for subjecting the pulsation chamber (5) formed between the teat cup and the liner to a pulsating pressure varying between a low pressure and a high pressure, which high pressure is higher than the pressure in the interior of the liner. Means are provided (12, 16, 18) for controlling the respective pressures in the liner and the pulsation chamber. A flow sensing member (17) senses the flow of the milk which during milking increases to a main flow, then amounts to the main flow, and diminishes from the main flow in a terminating phase of milking. The pressure control means is adapted to control the various pressures in response to the flow sensing member (17) sensing during the terminating milking phase that the milk flow has diminished to a predetermined portion of the main flow, such that the low pressure in the pulsation chamber is higher than the pressure in the liner, at least during a part of the terminating milking phase.

8 Claims, 2 Drawing Sheets

MILKING MACHINE AND A METHOD OF MILKING BY MEANS OF THE SAME

Background of the Invention

1. Field of the Invention

The present invention relates to an apparatus and a method for milking animals.

2. Description of the Prior Art

Each of U.S. Pat. No. 3,754,532 and G.B. 1,506,636 discloses a milking apparatus comprising at least on teat cup with a liner for receiving a teat, said liner has a milk conducting passage, a pulsation chamber being formed between the teat cup and the liner, and means for subjecting the milk conducting passage of the liner to a pressure lower than atmospheric pressure and the pulsation chamber to a pulsating pressure varying between a low and a high pressure, said high pressure being higher than the pressure in the milk conducting passage of the liner. Further, the milking apparatus comprises means for controlling the respective pressures in the milk conducting passage of the liner and the pulsation chamber, and means for sensing the milk flow. During milking the milk flow increases to a main flow in an initial first phase of milking, amounts to said main flow in a second phase of milking, and diminishes from said main flow in a third phase of milking.

The known milking apparatus according to U.S. Pat. No. 3,754,532 is arranged to keep the low pressure in the pulsation chamber and the pressure in the interior of the liner, i.e. in the milk conducting passage of the liner, substantially higher when the milk flow is less than a predetermined relatively small value than when the milk flow exceeds this flow value. When milking with this apparatus, the tests are subjected to weaker suction forces more caring to the teats during the first milking phase before the milk has started flowing through the teats, and during the third milking phase when the milk flow has ceased, than when the milk flows through the teats in a flow exceeding said small value. This is an advantage, since a teat is considerably more sensitive to external influences when it is empty, than when milk is flowing through it. Consequently, the risk of injuring the teats is decreased.

The known milking apparatus according to G.B. 1,506,636 operates in a manner similar to the apparatus according to U.S. Pat. No. 3,754,532 but is arranged to keep only the low pressure in the pulsation chamber substantially higher when the milk flow during milking is below a predetermined relatively small value, than when the milk flow exceeds this value. Consequently, the liner does not open completely during the pulsating pressure in the pulsation chamber when the milk flow is below said small value, which results in that only the tip of the teat is subjected to suction forces while the rest of the teat is protected against these.

Thus, the above described known milking apparatuses aim at more careful treatment of the teats during so called dry milking of the latter, i.e. when there is no milk flowing through the teats. However, these known apparatuses do not solve the problem of preventing crawling of the teat cups on the teats during the third milking when the milk flow ceases.

During the second milking phase each teat is distended and is in a firm friction engagement with the liner, so that the teat cup is in its intended position on the teat. However, when the milk flow diminishes during the third milking phase the teat becomes slacker and its frictional engagement with the liner weaker and weaker, whereby the teat tends to be sucked deeper into the teat cup. Thus, each teat cup crawls on the teat towards the udder and thereby causes throttling of the milk conducting interior of the teat close to the udder, so that milking becomes more difficult and finally the milk flow completely ceases in spite of the fact that some milk still remains in the udder.

SUMMARY OF THE INVENTION

The present invention provides a new milking apparatus by means of which crawling of each teat cup is counteracted when the milk flow diminishes during milking.

Thus, the invention hereof provides a milking apparatus, comprising at least one teat cup with a liner for receiving a teat, said liner having a milk conducting passage, a pulsation chamber being formed between the teat cup and the liner, means for subjecting the pressure and the pulsation chamber to a pulsating pressure varying between a low and a high pressure, said high pressure being higher than the pressure in the milk conducting passage of the liner, means for controlling the respective pressures in the milk conducting passage of the liner and the pulsation chamber, and means for sensing milk flow, which during milking increases to a main flow in an initial first phase of milking, amounts to said main flow in a second phase of milking, and diminishes from said main flow in a third phase of milking. Said pressure control means is adapted to control the various pressures in response to said sensing means sensing during said third milking phase that the milk flow has diminished to a predetermined portion of the main flow, such that the low pressure in the pulsation chamber is higher than the pressure in the milk conducting passage of the liner, at least during a part of the third milking phase.

In the result, the liner will open only partly during said part of the third milking phase when the low pressure prevails in each pulsation chamber. This has the advantage that the pressure of the liner against the teat will be stronger than that of a completely opened liner, so that the frictional engagement of the liner with the teat will increase, whereby crawling of the teat cup is counteracted. Because of said stronger pressure of the liner against the teat, it is true that the teat canal at the tip of the teat will be somewhat throttled, but this will result only in that the milk flow will decrease somewhat so that milking time is prolonged insignificantly. The main thing is that crawling of the teat cup is counteracted so that the udder is completely emptied.

Another advantage with the milking apparatus of the invention is that the risk of so called impact is decreased. Impact is when small milk droplets are sucked backwards at a high velocity into the liner when this opens. Such small milk droplets at a high velocity can penetrate the teat canal and give rise to infections. Since according to the invention the liner is opened only partly during pulsation, the resulted momentary pressure reduction in the liner below the tip of its teat is decreased, so that milk droplets flowing backwards cannot obtain the same velocity as in a completely opened liner. Thus, the risk of small milk droplets penetrating the teat canal of the teat is reduced.

Yet another advantage of the milking apparatus of the invention is that the teat cups can be designed to be of less weight than the conventional teat cups, which facilitates the manual handling of the teat cups when applying and removing them, without increasing the risk of crawling of the teat cups during milking. A conventional teat cup is usually weighted to prevent crawling, but this increases the risk of the conventional heavy teat cup falling off the teat during milking.

A further advantage with the milking apparatus of the invention is that when using it for milking of e.g. a cow, the teats of the cow are treated more carefully than when milking by means of the previously described known milking apparatuses. At least one of the teats of a cow usually stops yielding milk earlier than the others. The first mentioned teat will therefore be dry-milked in an injurious way at least until the other teats stop yielding milk. By means of the new milking apparatus such an injuriously dry-milking of a teat can be avoided by controlling the liners to open only partly when the total milk flow has decreased to a predetermined part of the main flow, e.g. corresponding to about full flow from three of the four teats of the cow. Thus, when dry-milking of at least one of the teats occurs, the liners will only open partly, whereby all of the teats are treated carefully.

By the expression "main flow" is intended a flow, the average value of which during a plurality of pulsation cycles does not substantially deviate from a maximum flow value sensed by the sensing means. The size of the main flow usually differs from one animal to another and from one milking occasion to another. However, the above described advantages of the milking apparatus of the invention are obtained independently of how large the main flow is at any particular milking, since during the third milking phase the pressure control means is only adapted to control the pressure relationship between the interior of the liner and the pulsation chamber in response to the sensing means sensing the volume of the milk flow relative to that of the main flow.

The pressure control means may be adapted to control either only the low pressure in the pulsation chamber, or only the pressure in the liner, or both of these pressures. However, the pressure control means is suitably adapted to increase the low pressure in the pulsation chamber in response to the sensing means sensing during the third milking phase that milk flow has diminished to said predetermined part of the main flow, such that said low pressure exceeds the pressure in the liner.

Preferably, in response to the sensing means the pressure control means is adapted to adjust the low pressure in the pulsation chamber during the first milking phase to a first value, when the milk flow is below a predetermined relatively small flow, and to a second value, when the milk flow at least amounts to said small flow, and maintain the low pressure in the pulsation chamber at said second value during the second milking phase. In addition, the pressure control means is adapted to maintain the pressure in the milk conducting passage of the liner at a predetermined value at least during the second milking phase and during said part of the third milking phase. Said predetermined value for the pressure in the milk conducting passage of the liner is smaller than said first value and bigger than or equal to said second value. The pressure control means is adapted to adjust the low pressure in the pulsation chamber to said first value in response to the sensing means sensing during the third milking phase that the milk flow has diminished to said predetermined portion of the main flow.

According to an embodiment of the milking apparatus of the invention the pressure control means comprises a first adjusting device for adjusting the pressure in the milk conducting passage of the liner, a second adjusting device for adjusting the low pressure in the pulsation chamber, and a control unit for controlling the adjusting devices in response to sensings from the sensing means.

The sensing means is suitably constituted by a flow sensing member.

The invention also provides a method of milking comprising applying at least one teat cup liner on a teat of an animal; subjecting the teat cup liner to an exterior pulsating pressure varying between a low pressure and a high pressure, subjecting a milk conducting passage of the teat cup liner to a constant pressure lower than atmospheric pressure and said high pressure, for extracting milk from the animal in a flow which increases to a main flow in a first phase of milking, amounts to said main flow in a second phase of milking, and diminishes from said main flow in a third phase of milking, and keeping said low pressure of the pulsating pressure higher than the pressure in the milk conducting passage of the teat cup liner at least during a part of the third milking phase, when the milk flow has diminished to a predetermined portion of the main flow during said third milking phase.

DESCRIPTION OF THE PREFERRED EMBODIMENT

Figure 1:
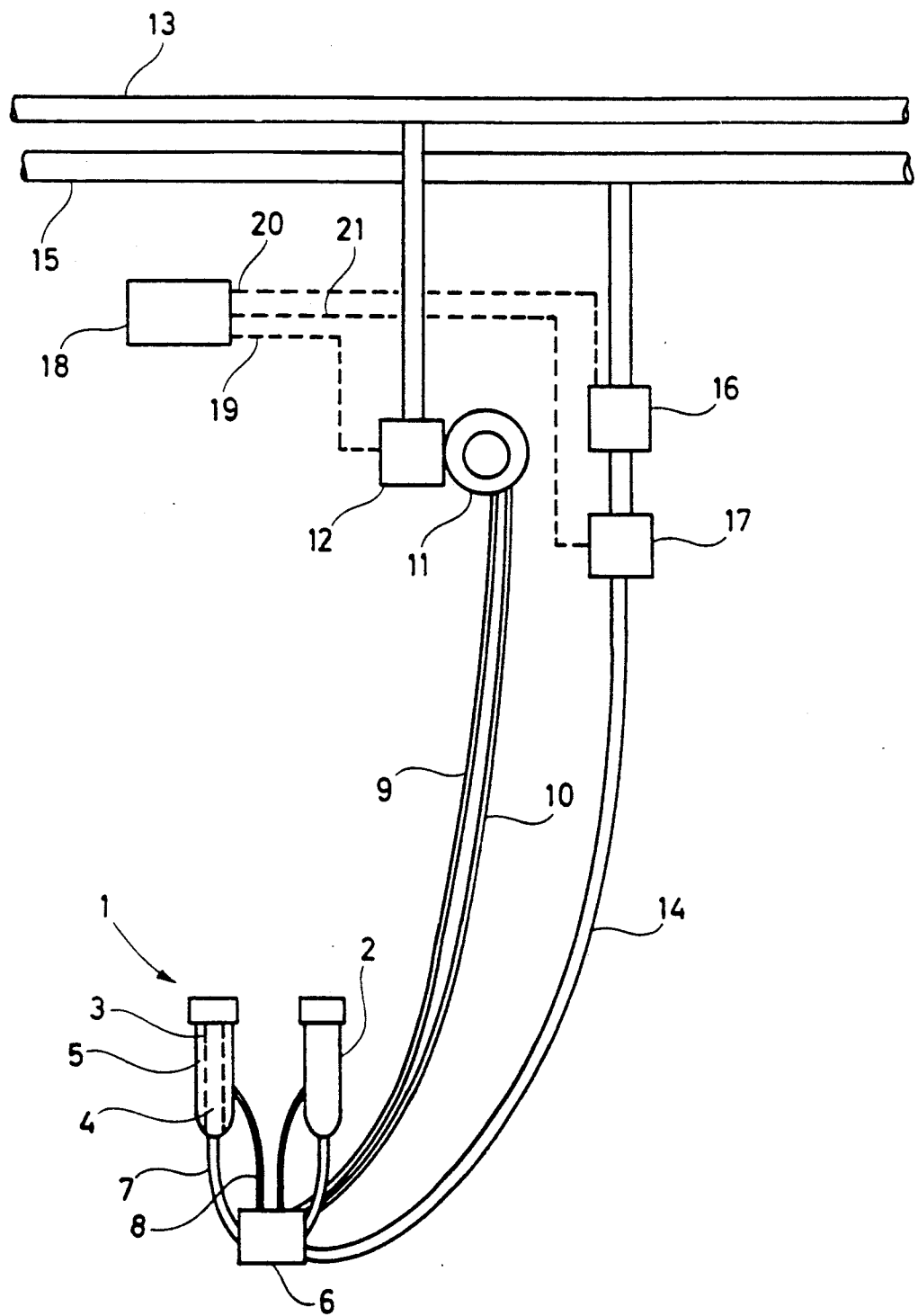
FIG. 1 is a preferred embodiment of the milking apparatus of the invention.

The milking apparatus shown in FIG. 1 comprises a milking means 1 with four teat cups 2, in which liners 3 are mounted (only two teat cups are shown). Each liner 3 has an interior milk conducting passage 4 and forms with the surrounding wall of the teat cup 2 a pulsation chamber 5 between the teat cup 2 and the liner 3. A teat cup claw 6 is connected to the liners via short milk tubes 7, the interior of which communicates with the interior of the liners, and to the teat cups 2 via short pulsation tubes 8, the interior of which communicate with the pulsation chambers 5. Via the teat cup claw 6 the short pulsation tubes 8 are connected in pairs with long pulsation tubes 9 and 10, respectively, extending upwards from the teat cup claw 6 to the pulsator 11, which is adapted to reduce the pressure alternately in the pulsation chambers of two pairs of teat cups. Via an adjusting device 12 for adjusting the pressure in the pulsator the pulsator is connected to a conduit 13, the interior of which is subjected to a subpressure produced by a vacuum source.

Via the teat cup claw 6 all of the short milk tubes 7 are connected to a long milk tube 14 extending upwards from the teat cup claw 6 to a milk conduit 15, the interior of which communicates with the vacuum source (not shown). In the long milk conduit 14 there is an adjusting device 16 for adjusting the pressure in the conduit 14 and a flow sensing member 17 for sensing the milk flow.

A control unit 18 is connected to the adjusting devices 12, 16 and the flow sensing member 17 through respective control conduits 19, 21 for controlling the adjusting devices 12, 16 in response to input from the flow sensing member 17.

Figure 2:
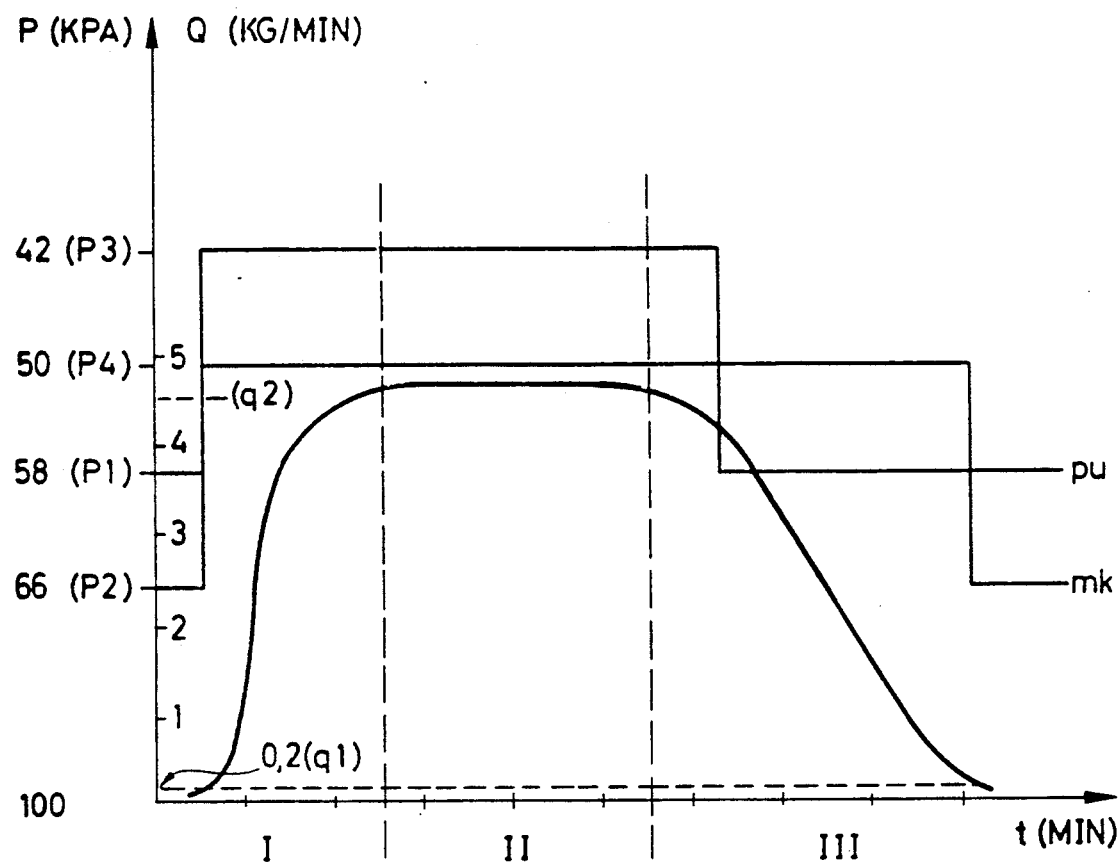
FIG. 2 is a diagram showing milk flow Q per time unit t (kg/min) and the pressures P (kPa) in the liners and the pulsation chambers, respectively, per time unit t (minute) during milking by means of the milking apparatus according to FIG. 1. In the diagram the low pressure in the pulsation chamber is represented by the graph pu and the pressure in the liner by the graph mk.

The milking apparatus is operated in the following way:

The teat cups 2 are applied on e.g. a cow to be milked. In the beginning of the milking during a first phase I the control unit 18 controls the adjusting device 12 so that the pulsator subjects the pulsation chambers 5 with a pulsating pressure varying between a low pressure p1 of 58 kPa and a high pressure of 100 kPa, i.e. the atmospheric pressure (FIG. 2). The pressure in the pulsation chambers pulsates in a frequency of about 1 pulse/second. At the same time the control unit 18 controls the adjusting device 16 so that the pressure in the milk conducting passages 4 of the liners are kept on a value p2 of 66 kPa, i.e. higher than the low pressure p1 in the pulsation chambers 5. This ensures that the liners 3 are opened completely during the pulsations, whereby the start-up of the milk flow through the teats is facilitated.

When the milk flow has increased to a relatively small value q1 of about 0.2 kg/min., which is indicated by the flow sensing member 17, the control unit 18 controls the adjusting devices 12 and 16, so that the low pressure in the pulsation chambers 5 is decreased to a value p3 of 42 kPa, while the pressure in the liners 3 is decreased to a value p4 of 50 kPa, i.e. to a value which is higher than the value of the low pressure in the pulsation chambers 5, which ensures a complete opening of the liners during the pulsations. In addition to this, the liners are opened relatively fast when each liner is subjected to a pressure difference of 8 kPa between the interior of the liner and the pulsation chamber during each pulsation, which results in milk flow of relatively long duration during each pulsation when the liners are open. Now the milk flow increases rapidly to a main flow, the size q2 of which here is supposed to be about 4.5 kg/min. in average. The size of the main flow differs usually from one animal to another. Then, a second phase II of the milking ensues, during which said main flow prevails and the main part of the milk in the udder of the cow is extracted. During phase II the control unit 18 registers the size q2 of the main flow.

After phase II of the milking a third phase III ensues, during which the milk flow diminishes from the main flow. When the main flow during phase III has diminished to a predetermined part (here 90%) of the volume of the main flow, the control unit 18 controls the adjusting device 12 so that the low pressure in the pulsation chambers 5 is increased from 42 kPa (p3) to 58 kPa (p1), i.e. to a value which is higher than the value of the pressure in the liners. Hereby the liners are not completely opened during the pulsations, whereby the friction engagement of the liners with the teats will be greater.

When the milk flow during phase III has diminished to said relatively small value q1 of about 0.2 kg/min. the control unit 18 controls the adjusting device 16 so that the pressure in the liners is increased from 50 kPa (p4) to 66 kPa (p2). By this the liners are completely opened during the pulsations, so that the rest of the milk easily can be milked out of the udder and the liners thereafter easily can be removed from the teats manually or by means of an automatic removal device.

We claim:

1. A milking apparatus comprising:

at least one teat cup with a liner for receiving a teat, said liner having a milk conducting passage, a pulsation chamber being formed between the teat cup and the liner, means for subjecting the milk conducting passage of the liner to a pressure lower than atmospheric pressure and the pulsation chamber to a pulsating pressure varying between a low and a high pressure, said high pressure being higher than the pressure in the milk conducting passage of the liner, means for controlling the respective pressure in the milk conducting passage of the liner and the pulsation chamber, means for sensing milk flow, which during milking increases to a main flow in an initial first phase of milking, amounts to said main flow in a second phase of milking, and diminishes from said main flow in a third phase of milking, and said pressure control means being adapted to control the various pressures in response to said sensing means sensing during said third milking phase that the milk flow has diminished to a predetermined portion of the main flow, such that the low pressure in the pulsation chamber is higher than the pressure in the milk conducting passage of the liner, at least during a part of the third milking phase.

2. A milking apparatus in accordance with claim 1, wherein the pressure control means is adapted to increase the low pressure in the pulsation chamber in response to the sensing means sensing during the third milking phase that the milk flow has diminished to said predetermined portion of the main flow, such that said low pressure exceeds the pressure in the milk conducting passage of the liner.

3. A milking apparatus in accordance with claim 2, wherein:

in response to the sensing means, the pressure control means is adapted to adjust the low pressure in the pulsation chamber during the first milking phase to a first value, when the milk flow is below a predetermined relatively small flow and to a second value, when the milk flow at least amounts to said small flow, and maintain the low pressure in the pulsation chamber at said second value during the second milking phase, said pressure control means is adapted to maintain the pressure in the milk conducting passage of the liner at a predetermined value at least during the second milking phase and during said part of the third milking phase, said predetermined value of the pressure in the milk conducting passage of the liner is smaller than said first value and larger than or equal to said second value, and said pressure control means is adapted to adjust the low pressure in the pulsation chamber to said first value in response to the sensing means sensing during the third milking phase that the milk flow has diminished to said predetermined portion of the main flow.

4. A milking apparatus in accordance with claim 3, wherein the pressure control means comprises a first adjusting device for adjusting the pressure in the milk conducting passage of the liner, a second adjusting device for adjusting the low pressure in the pulsation chamber, and a control unit for controlling the adjusting devices in response to sensings from the sensing means.

5. A milking apparatus in accordance with claim 4, wherein the sensing means is constituted by a flow sensing member.

6. A method of milking comprising:
applying at least one teat cup liner on a teat of an animal,
subjecting the teat cup liner to an exterior pulsating pressure varying between a low pressure and a high pressure,
subjecting a milk conducting passage of the teat cup liner to a constant pressure lower than atmospheric pressure and said high pressure, for extracting milk from the animal in a flow which increases to a main flow in a first phase of milking, amounts to said main flow in a second phase of milking, and diminishes from said main flow in a third phase of milking, and
keeping said low pressure of the pulsating pressure higher than the pressure in the milk conducting passage of the teat cup liner at least during a part of the third milking phase, when the milk flow has diminished to a predetermined portion of the main flow during said third milking phase.

7. A method in accordance with claim 6, wherein the low pressure of said pulsating pressure is kept lower than or equal to the pressure in the milk conducting passage of the teat cup liner at least during the second phase, and said low pressure is increased to exceed the pressure in the milk conducting passage of the teat cup liner during the third milking phase, when the milk flow has diminished to said predetermined portion of the main flow.

8. A method in accordance with claim 7, wherein:
the low pressure of said pulsating pressure during the first milking phase is kept at a first value, when the milk flow is below a predetermined relatively small flow, and is adjusted to a second value, when the milk flow has increased to said small flow, and during the second milking phase is maintained at said second value,
the pressure in the milk conducting passage is kept at a predetermined value at least during the second milking phase and said part of the third milking phase, said predetermined value being less than said first value and larger or equal to said second value, and
the low pressure of said pulsation pressure is adjusted to said first value during the third milking phase, when the milk flow has decreased to said predetermined portion of the main flow.

* * * * *